Patented Feb. 28, 1939

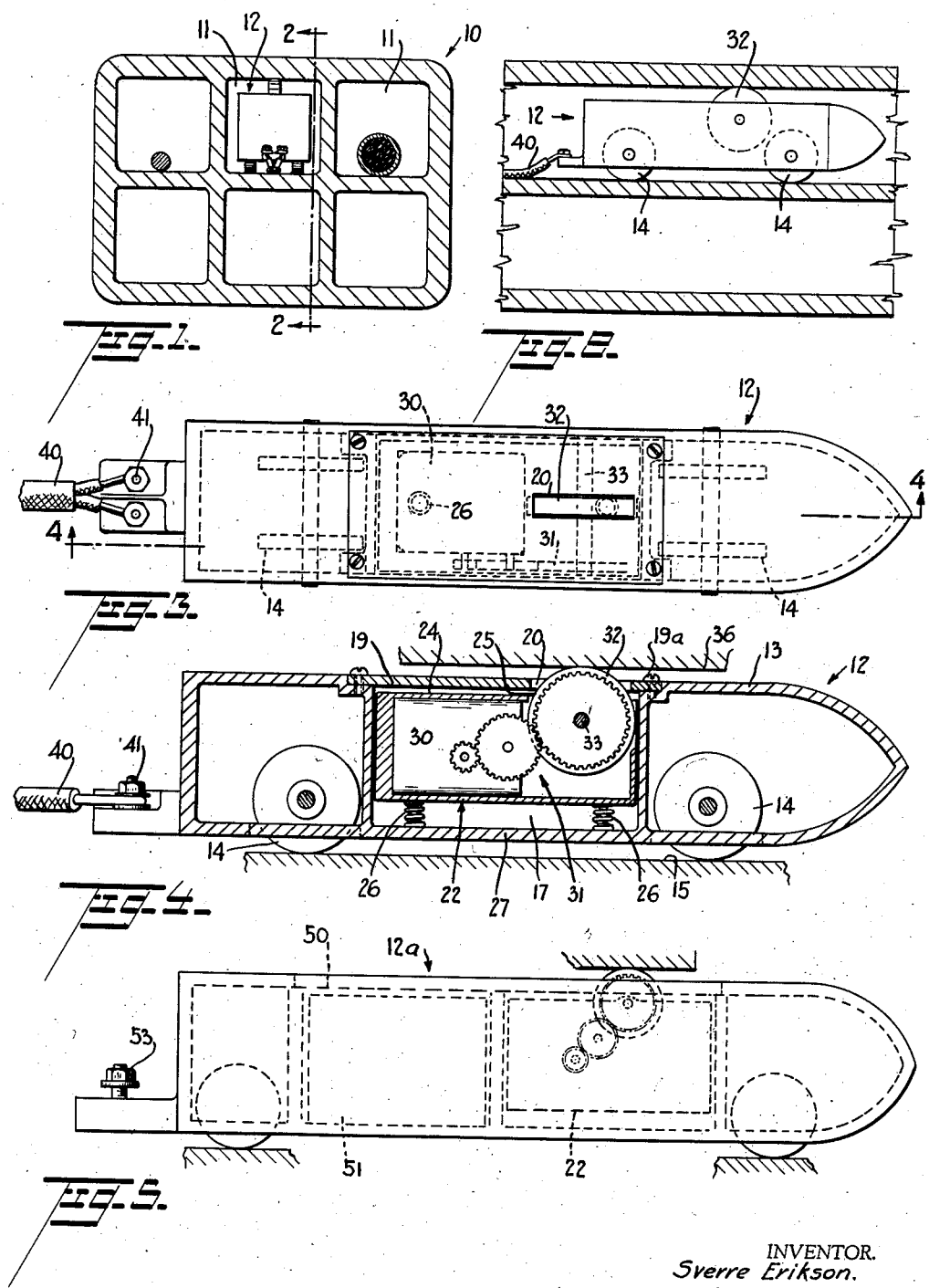

2,148,982

UNITED STATES PATENT OFFICE 2,148,982

CABLE TRACTOR FOR CONDUITS

Sverre Erikson, Brooklyn, N. Y.

Application October 27, 1938, Serial No. 237,257

5 Claims. (Cl. 175—377)

This invention relates to cable tractors for conduits.

An object of this invention is to provide a cable tractor for conduits, comprising a car on idler wheels contacting the bottom of the conduit, and an electric motor, spring mounted on the car, and connected through a train of reducing gearing to a wheel adapted to be yieldingly pressed upwardly by the springs on which the motor is mounted, against the top wall of the conduit, power being supplied to the motor either by a battery on the car, or through wires attached to the car, and leading to a power supply, and connected to the terminals of the motor. With a car using a battery for power supply, any suitable "snake" may be attached to the car. With a car in which the motor is supplied with current through lead wires attached to the motor terminals on the car, the wires themselves serve as a "snake" to pull through the heavier cables.

Another object of this invention is to provide in a cable tractor for conduits, a car, and a wheel on said car spring pressed against the top wall of the conduit to yield when striking an obstruction, and rotated by a motor on the car.

Yet another object of this invention is to provide a strong, rugged and compact cable tractor of the character described, which shall be relatively inexpensive to manufacture, positive in action, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is a transverse cross-sectional view of a conduit, and showing the rear end of a cable tractor therein, embodying the invention;

Fig. 2 is a cross-sectional view taken on line 2—2 of Fig. 1;

Fig. 3 is a top plan view of a cable tractor, embodying the invention;

Fig. 4 is a cross-sectional view taken on line 4—4 of Fig. 3, and showing the car in a conduit; and Fig. 5 is a side elevational view of a cable tractor, embodying the invention, and illustrating a modified construction.

Referring now in detail to the drawing, 10 designates a multi-cell cable conduit having a plurality of cells or conduits 11. In one of the cells there is shown a cable tractor 12, embodying the invention.

Said tractor 12 comprises a car having a body 13 mounted on front and rear idler wheels 14 contacting the lower wall 15 of the cell. The front of the car may be bullet shaped or otherwise streamlined. In the car is a compartment 17 open at the top. The top of compartment 17 is closed by a cover 19 fixed to the car by screws 19a, and having a longitudinal slot or opening 20, for the purpose explained hereinafter.

In compartment 17 is a case or box 22 having a top wall 24 formed with a slot or opening 25 registering with said slot or opening 20. Coil compression springs 26 interposed between the bottom wall 27 of compartment 17 and the bottom of box or case 22, to push the box upwardly toward the cover 19 of said compartment.

Mounted in the box 22 is an electric motor 30, connected by a train of reducing gears 31, to a wheel 32 journalled on a horizontal axis 33. Wheel 32 projects through openings 20, 25 and is pressed against the top wall 36 of the conduit or cell 11 by springs 26.

A pair of wire leads 40 may be connected to binding posts or terminals 41 on the rear end of the car, said terminals being connected by wires, (not shown) to the terminals for the motor 30.

The motor 30 thus rotates wheel 32 which causes the car to advance. The wires 40 serve as a "snake" to pull through the heavier electric cable.

The yielding connection between the traction wheel 32 and the car permits the car to pass obstructions on either the bottom wall or the top wall of the conduit 11.

In Fig. 5 there is shown a tractor 12a, similar to car 12, except that the former has an additional compartment 50 for a storage battery 51 to supply current for the motor in box 22. Any suitable "snake" such as #10 gauge wire, may be attached to binding posts 53 at the rear end of the car 12a.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A cable tractor for a conduit, comprising a car on wheels adapted to contact the bottom wall of the conduit, a member on the car, supported on springs interposed between said member and car, to press the member upwardly, an electric motor on said member, a wheel journalled on said member and adapted to contact the top wall of said conduit, and reduction gearing on said member connecting said motor with said wheel.

2. A cable tractor for a conduit, comprising a car on wheels adapted to contact the bottom wall of the conduit, a member on the car, supported on springs interposed between said member and car, to press the member upwardly, an electric motor on said member, a wheel journalled on said member and adapted to contact the top wall of said conduit, reduction gearing on said member connecting said motor with said wheel, and a storage battery on said car for supplying current to said motor.

3. A cable tractor for a conduit, comprising a car on wheels adapted to contact the bottom wall of said conduit, said car having a compartment open at the top, a cover attached to said car to cover said compartment, said cover being formed with an opening, a box in said compartment supported on compression springs interposed between said box and the bottom wall of said compartment, and adapted to press said box upwardly toward the cover, said box having an opening registering with the opening in said cover, a motor mounted in said box, a wheel journalled in said box on a horizontal axis and projecting through the openings in said box and cover and being adapted to be yieldingly pressed upwardly against the top wall of said conduit by said springs, and a train of reduction gearing connecting said motor with said wheel.

4. A cable tractor for a conduit, comprising a car on wheels adapted to contact the bottom wall of said conduit, said car having a compartment open at the top, a cover attached to said car to cover said compartment, said cover being formed with an opening, a box in said compartment supported on compression springs interposed between said box and the bottom wall of said compartment, and adapted to press said box upwardly toward the cover, said box having an opening registering with the opening in said cover, a motor mounted in said box, a wheel journalled in said box on a horizontal axis and projecting through the openings in said box and cover and being adapted to be yieldingly pressed upwardly against the top wall of said conduit by said springs, a train of reduction gearing connecting said motor with said wheel, and a pair of binding posts at the rear end of the car, connected to the terminals of the motor, and serving as terminals for lead wires attached thereto, to supply current for said motor.

5. A cable tractor for a conduit, comprising a car on wheels adapted to contact the bottom wall of said conduit, said car having a compartment open at the top, a cover attached to said car to cover said compartment, said cover being formed with an opening, a box in said compartment supported on compression springs interposed between said box and the bottom wall of said compartment, and adapted to press said box upwardly toward the cover, said box having an opening registering with the opening in said cover, a motor mounted in said box, a wheel journalled in said box on a horizontal axis and projecting through the openings in said box and cover and being adapted to be yieldingly pressed upwardly against the top wall of said conduit by said springs, a train of reduction gearing connecting said motor with said wheel, and a storage battery on said car to supply power for said motor.

SVERRE ERIKSON.